United States Patent [19]

Inoue

[11] Patent Number: 5,109,965
[45] Date of Patent: May 5, 1992

[54] TEMPERATURE SENSITIVE HYDRAULIC FAN COUPLING

[75] Inventor: Hiroshi Inoue, Shizuoka, Japan

[73] Assignee: Usui Kokusai Sangyo Kaisha Ltd., Japan

[21] Appl. No.: 621,293

[22] Filed: Nov. 30, 1990

[30] Foreign Application Priority Data

Dec. 1, 1989 [JP] Japan .................. 1-139826[U]

[51] Int. Cl.⁵ .................................. F16D 31/00
[52] U.S. Cl. .................. 192/58 B; 192/58 R; 192/82 T
[58] Field of Search ............. 192/58 B, 58 R, 82 T, 192/104 F

[56] References Cited

U.S. PATENT DOCUMENTS

| 2,879,755 | 3/1959 | Weir | 123/41.12 |
|---|---|---|---|
| 2,988,188 | 6/1961 | Tauschek | 192/82 |
| 3,059,745 | 10/1962 | Tauschek | 192/58 |
| 3,217,849 | 11/1965 | Weir | 192/82 |
| 3,259,221 | 7/1966 | Godfrey | 192/58 |
| 3,272,188 | 9/1966 | Sabat | 123/41.11 |
| 3,430,743 | 3/1969 | Fujita et al. | 192/58 |
| 3,463,282 | 8/1969 | Fujita et al. | 192/58 |
| 3,642,105 | 2/1972 | Kikuchi | 192/58 B |
| 3,727,735 | 4/1973 | La Flame | 192/58 B |
| 3,840,101 | 10/1974 | Peter et al. | 192/58 B |
| 3,856,122 | 12/1974 | Leichliter | 192/58 B |
| 3,964,582 | 6/1976 | Mitchell | 192/58 B |
| 4,238,016 | 12/1980 | Yoshida et al. | 192/58 B |
| 4,281,750 | 8/1981 | Clancey | 192/58 B |
| 4,403,684 | 9/1983 | Haeck | 192/58 B |
| 4,505,367 | 3/1985 | Martin | 192/58 B |
| 4,629,046 | 12/1986 | Martin | 192/58 B |
| 4,665,694 | 5/1987 | Brunken | 192/58 B |
| 4,667,791 | 5/1987 | Martin et al. | 192/58 B |
| 4,685,549 | 8/1987 | Brunken et al. | 192/58 B |
| 4,699,258 | 10/1987 | Johnston et al. | 192/58 B |
| 4,796,571 | 1/1989 | Ono et al. | 123/41.12 |
| 4,846,331 | 7/1989 | Ono | 192/58 B |
| 4,850,465 | 7/1989 | Ono | 192/58 B |
| 4,903,643 | 2/1990 | Takikawa et al. | 123/41.12 |
| 4,903,805 | 2/1990 | Ono | 192/58 B |
| 4,930,458 | 6/1990 | Takikiawa et al. | 123/41.12 |
| 5,004,085 | 4/1991 | Taureg | 192/58 B |

Primary Examiner—Leslie A. Braun
Assistant Examiner—Andrea Pitts
Attorney, Agent, or Firm—Anthony J. Casella; Gerald E. Hespos

[57] ABSTRACT

The present invention provides an improvement in the structure of a temperature sensitive hydraulic fan coupling for supplying a suitable amount of cooling air to the automobile engine according to the travelling conditions of the automobile. The conventional fan coupling of the above type has had the disadvantages that since the rotation of the fan is controlled by a torque transmission mechanism depending only on the variation of ambient temperature, no supply of a suitable amount of cooling air to the engine is made especially at the time of acceleration of the engine so that the reduction of the amount of horsepower consumption and fan noise level cannot be realized satisfactorily. To eliminate the above disadvantage, the present invention uses both a temperature responsive valve member and a centrifugal valve for automatically controlling the flow of oil within the coupling thereby reducing the amount of horsepower consumption and fan noise level.

8 Claims, 5 Drawing Sheets

ACCELERATION TIME
(LARGE SPEED DIFFERENCE)

ACCELERATION TIME
(SMALL SPEED DIFFERENCE)

PRIOR ART

TEMPERATURE SENSITIVE HYDRAULIC FAN COUPLING

BACKGROUND OF THE INVENTION

1. Field of the Invention

The present invention relates to an improvement in the structure of a temperature sensitive hydraulic coupling of the type in which the rotation of the automobile engine cooling fan is automatically controlled by sensing the variation of ambient temperature depending on the travelling condition of the automobile so that a suitable amount of cooling air is supplied to the engine.

2. Description of the Prior Art

Conventionally, the above type of cooling fan coupling has been constructed such that as shown in FIGS. 9 and 10, a plurality of communication holes 27' are provided in a drive disk 27 (corresponding to the essential portion of the present invention) and the rotation of the fan is controlled only by adjusting the flow of oil from an oil chamber 26 to a torque transmission chamber 24.

However, the above-mentioned prior art technology has had such disadvantages that since it relies on a torque transmission mechanism based on the variation of the ambient temperature, the amount of cooling air to be supplied to the engine becomes too large by excessive rotation of the fan as shown by the curve B of FIG. 6a at the time of high speed rotation of the engine during high speed travelling of the automobile for which not so much amount of cooling air by the fan is required and further, the number of revolutions of the fan also increases due to a rapid increase in the number of revolutions of the drive shaft as shown by the curves Bs of FIGS. 6b and 6c with respect to cases in which the engine is accelerated with a large and a small speed difference with respect to the normal travelling speed of the automobile so that the primary object of the fan coupling, that is, the reduction of the amount of horsepower consumption and fan noise level, is not fully achieved leaving a room for further improvement.

SUMMARY OF THE INVENTION

The present invention has been made in view of the above-described prior art problems and an object of the invention is to provide a temperature sensitive hydraulic fan coupling which is capable of supplying a suitable amount of cooling air to the engine of an automobile by controlling the number of revolutions of the fan even when the engine rotates at high speed for high-speed travelling of the automobile or it is rapidly accelerated from the normal travelling condition, which can reduce the amount of horsepower consumption and fan noise level in a more effective manner and which enables a multistage control to be performed for the fan.

In order to achieve the above object, the temperature sensitive hydraulic fan coupling according to the present invention has the following structure. That is, it comprises a rotary drive shaft attached with a drive disk at the top end thereof and a sealed box formed of a cover attached with a cooling fan on the outer periphery thereof and a casing. The sealed box is divided into an oil chamber and a torque transmission chamber by a partition plate having an oil flow adjusting hole(s) with the drive disk received within the torque transmission chamber. The oil chamber is provided with an oil circulation passage and the torque transmission chamber is provided with a dam on the inner wall surface thereof in opposite relationship with the outer periphery of the drive disk and in communication with the oil circulation passage. Further, a temperature sensitive member is attached to the central portion of the front surface of the cover which forms part of the sealed box together with the casing and a valve member is provided within the oil chamber with its one end fixed to the partition plate and the other end lying adjacent the oil flow adjusting hole(s). In operation, when the ambient temperature exceeds a set value, the valve member opens the oil flow adjusting hole of the drive disk while when the ambient temperature is below the set value, the valve member closes the hole, in response to the deformation of the temperature sensitive member through a connecting rod arranged between the valve member and the temperature sensitive member. Accordingly, the transmission of torque from the rotary drive shaft to the sealed box is controlled by an increase or decrease in the effective contact area of oil at torque transmission gaps formed between the drive disk and the opposing inner wall surfaces of the casing and the cover. In addition to the above arrangement, the present invention is characterized by further provision of at least a centrifugal valve on the drive disk in the vicinity of the communication hole such that as the rotary drive shaft operates at high speed, the centrifugal valve closes the communication hole. The centrifugal valve is made of a platy strip in the shape of a comma-shaped bead or substantially triangular in shape with its one end made pivotal and the other end suspended by a compression or tension spring. Where necessary, a plurality of such valves may be provided near a plurality of communication holes, respectively, formed radially or along substantially the same circumference.

With the above structure including the centrifugal valve provided near the circulation hole of the drive disk, when the engine of an automobile is rotated at high speed for high speed travelling of the automobile or when the engine is accelerated with a large or small speed difference with respect to the normal travelling condition of the automobile, the circulation hole of the drive disk is closed by the centrifugal valve so that the transmission of torque is performed only through one of the torque transmission gaps in the torque transmission chamber thereby reducing the number of revolutions of the fan and hence the amount of cooling air.

DETAILED DESCRIPTION OF THE INVENTION

The present invention will now be described by referring to the accompanying drawings.

Figure 1:
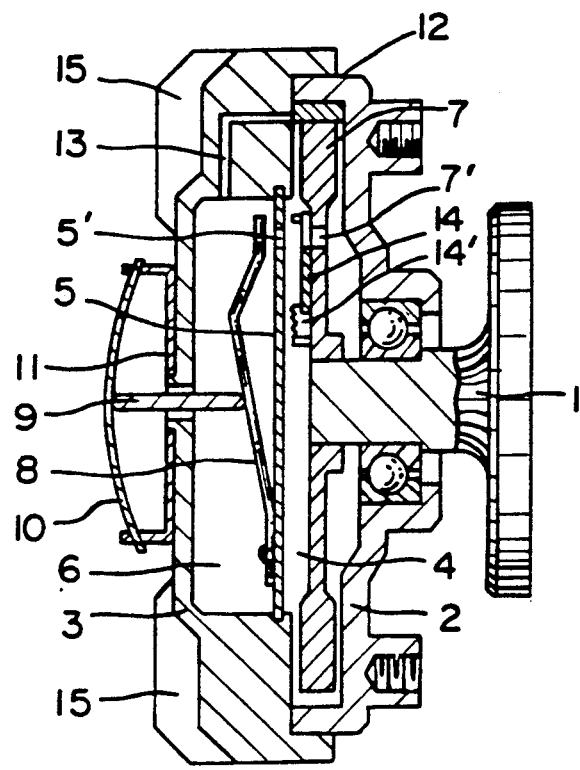
FIG. 1 is a vertical sectional view (partly cut away) of a temperature sensitive hydraulic fan coupling as one embodiment of the present invention.
Figure 2:
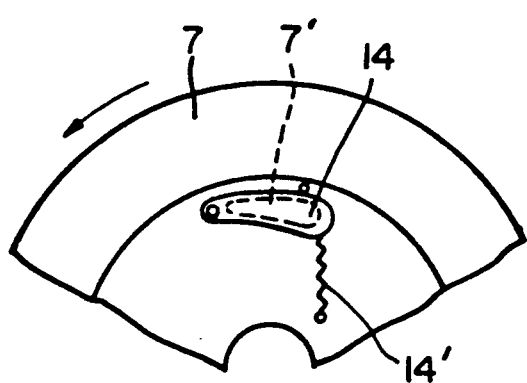
FIG. 2 is a front view (partly cut away) of a centrifugal valve as shown in FIG. 1 with the view illustrating the open condition of the valve at the time of low speed rotation of the coupling.
Figure 3:
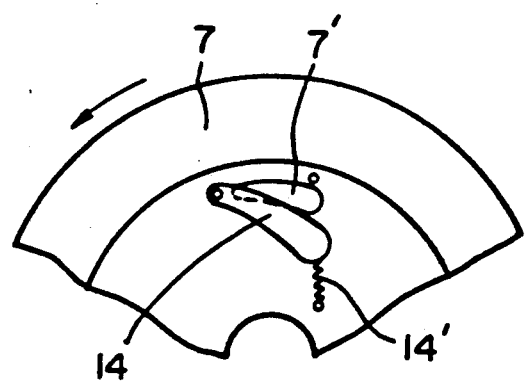
FIG. 3 is a front view of the valve of FIG. 2 with the view illustrating the open condition of the valve at the time of high speed rotation of the coupling.
Figure 4:
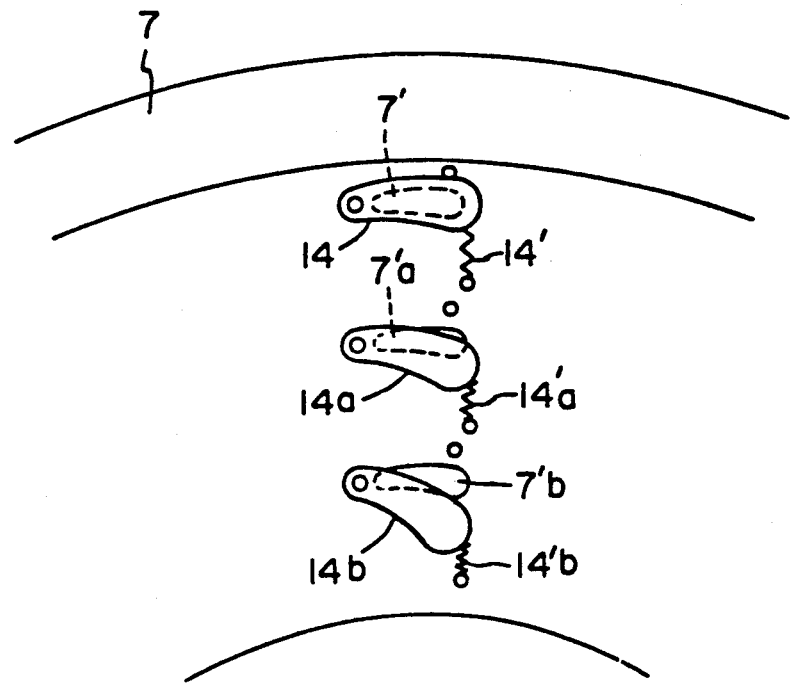
FIGS. 4 and 5 are views corresponding to FIGS. 2 and 3 and representing further embodiments of the present invention.
Figure 5:
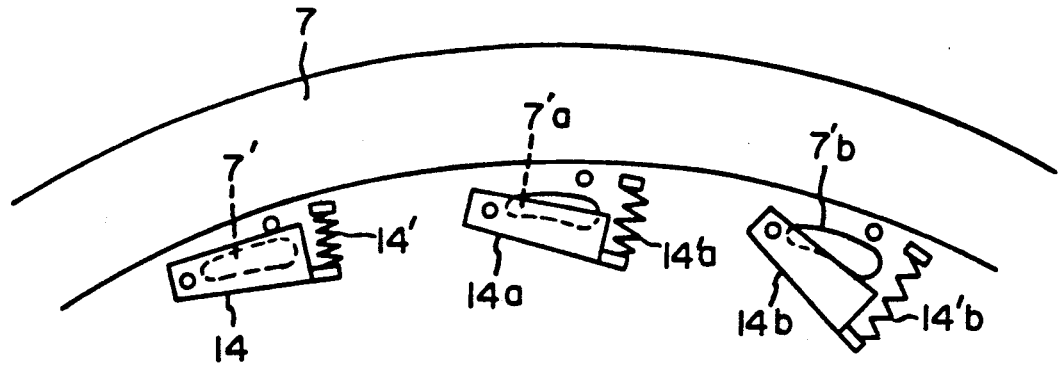
Figure 6A:
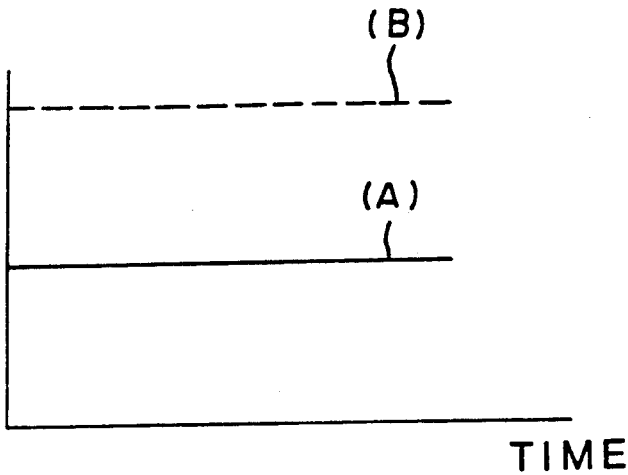
FIGS. 6a–6c are graphs showing characteristic and performance curves plotted for the purpose of comparison between the present invention and prior art.
Figure 6B:
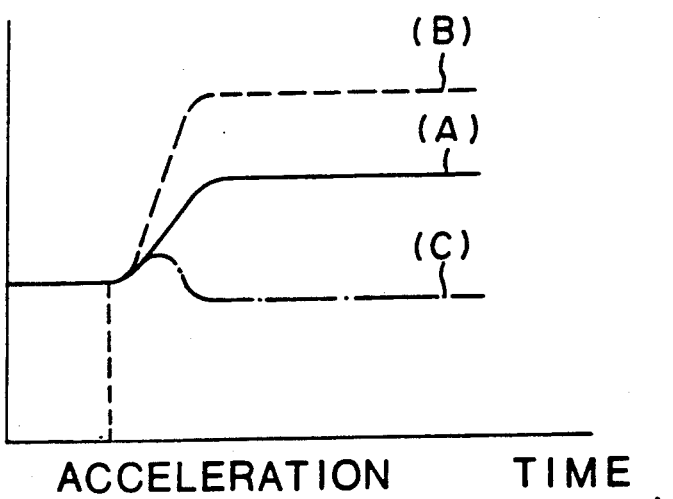
Figure 6C:
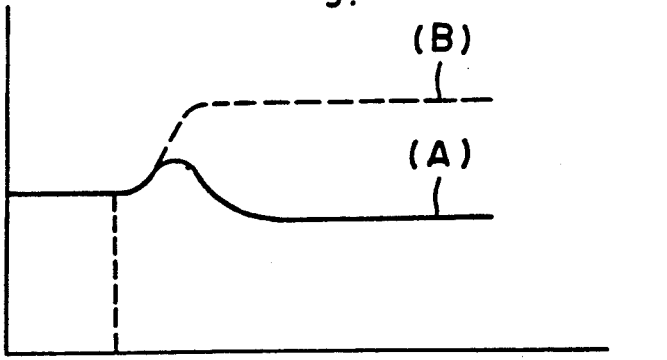
Figure 7:
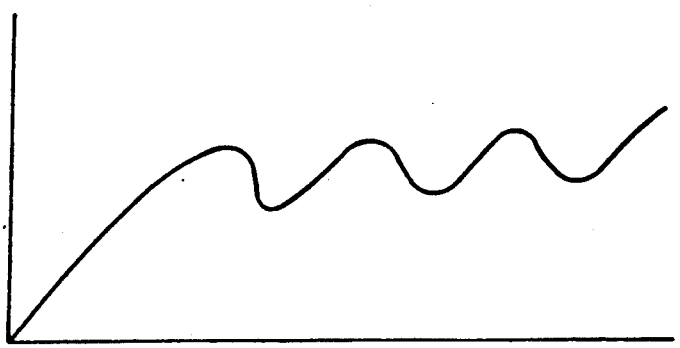
FIG. 7 is a graph showing a characteristic and performance curve with respect to a still another embodiment of the present invention.
Figure 8:
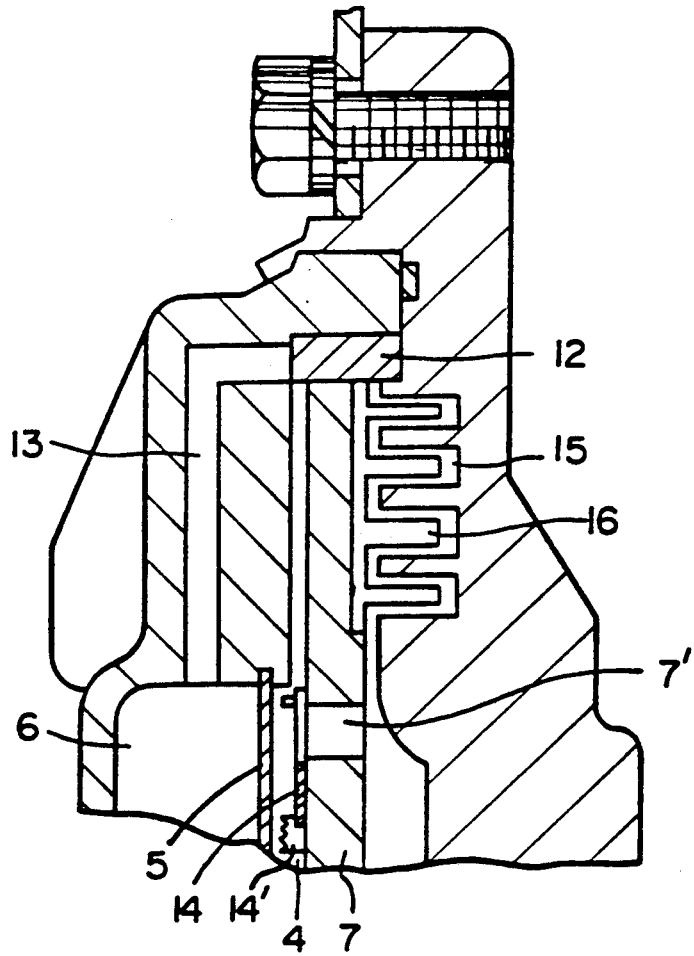
FIG. 8 is an enlarged vertical sectional view (partly cut away) of a temperature sensitive hydraulic fan coupling as a still further embodiment of the present invention with the view corresponding to FIG. 1.
Figure 9:
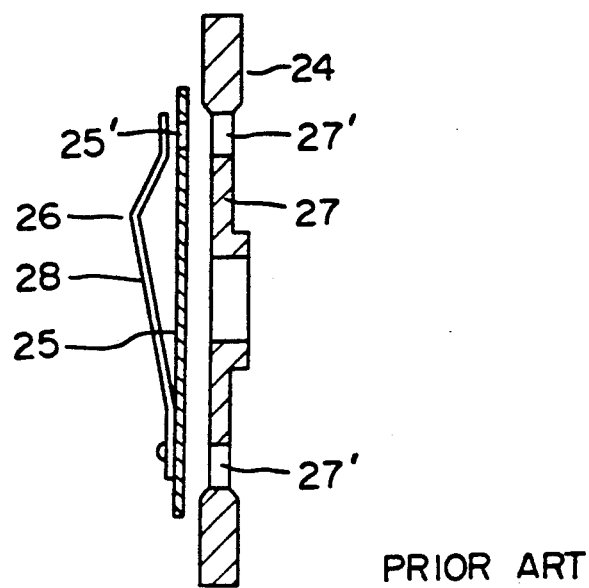
FIG. 9 is a vertical sectional view of a portion of a conventional coupling near a drive disk.
Figure 10:
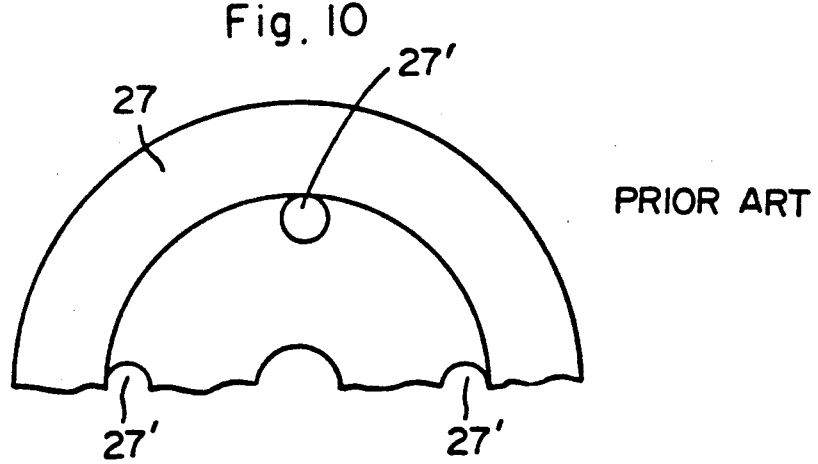
FIG. 10 is a front view of an upper half portion of the drive disk of FIG. 4.

In FIGS. 1-5 and 8, reference numeral 1 designates a rotary shaft having at the top end thereof a drive disk 7 provided with a plurality of communication holes 7'. The rotary shaft 1 supports, through a bearing, a sealed box comprising a cover 3 attached with a cooling fan (not shown) on the outer periphery thereof and a casing 2. Reference numeral 5 designates a partition plate dividing the interior of the sealed box into an oil chamber 6 and a torque transmission chamber 4 housing therein the above-mentioned drive disk 7. The partition plate 5 is provided with a flow adjusting hole 5' for adjusting a flow of oil from the oil chamber 6 to the torque transmission chamber 4. Further, the drive disk 7 within the torque transmission chamber 4 maintains small gaps from the opposing inner walls of the sealed box at the outer peripheral portion thereof so as to allow torque to be transmitted therethrough. Reference numeral 8 designates a valve member located in the oil chamber 6 so as to open and close the flow adjusting hole 5' of the partition plate 5 and whose one end is rivetted to the partition plate 5 with the other end lying adjacent to the flow adjusting hole 5'. Reference numeral 10 designates a temperature sensitive member comprising a platy bimetal having its both ends supported by a support metal 11 fixed to the front face of the cover 3 so that the valve member operates in response to the deformation of the temperature sensitive member 10 through a connecting rod 9 arranged between the valve member and the member 10 when the ambient temperature varies. Thus, when the ambient temperature exceeds a set value, the valve member 8 opens the flow adjusting hole 5' to allow oil in the oil chamber 6 to flow into the torque transmission chamber 4 thereby accelerating the transmission of torque while when the ambient temperature is below the set value, the valve number 8 closes the flow adjusting valve 5' thereby reducing the amount of torque transmission. Reference numeral 12 designates a dam formed at a portion of the inner peripheral wall of the sealed box opposing the outer peripheral portion of the drive disk 7 where the oil collects at the time of rotation of the disk. The dam 12 has a pumping function by providing a circulation passage 13 leading from the torque transmission chamber 4 to the oil chamber 6 so as to communicate with an inlet port formed in front of the dam 12. Reference numeral 14 is a centrifugal valve made of a platy strip which, for example, is like a comma-shaped bead (FIGS. 2-4) or substantially triangular (FIG. 5) in shape. The centrifugal valve 14 has its one end radially fixed on the drive disk 7 at a position near the circulation hole 7' and is attached with a tension spring (FIG. 4) or a compression spring 14' (FIG. 5). Thus the communication hole 7' is closed by the centrifugal valve 14 due to a centrifugal force resulting from high speed rotation of the drive disk 7 and the transmission of torque is performed only by one of the torque transmission gaps in the torque transmission chamber, that is, the front side gap, while the other gap (rear side) inhibits the circulation of oil therethrough. Reference is made to line A of FIGS. 6a-6c which illustrate the characteristics of the centrifugal valve during high speed travelling of the automobile and at the time of acceleration with a large and a small speed difference with respect to the normal travelling condition of the automobile. Reference numeral 15 designates a number of cooling fins projecting from the outer side wall of the sealed box.

Where desired, there may be provided a plurality of communication holes 7', 7'a, 7'b in the radial direction and a plurality of centrifugal valves 14, 14a, 14b biased by tension springs 14', 14'a, 14'b as shown in FIG. 4 so that the holes are closed in sequence, or these communication holes may be made small in diameter and arranged along substantially the same circumference as shown in FIG. 5 so that they are closed in sequence by compression springs 14', 14'a, 14'b of different spring constants thereby performing a multistage control for the fan as shown in FIG. 7 in which the number of revolutions of the fan is increased in a multi-stage fashion. In this case, unlike the example of FIG. 7, it is also possible to reduce the number of revolution of the fan in a multistage fashion. Further, the present invention may be applied to a temperature sensitive hydraulic fan coupling having a labyrinth mechanism 16 as shown in FIG. 8 in which the drive disk 7 is provided with a plurality of projections on one side surface thereof and a plurality of concave sections are formed in the opposing wall surface of the sealed box so that the projections are respectively received within the concave sections thereby forming a zigzag torque transmission gap 15 between the drive disk 7 and the sealed box. In this case, the centrifugal valve 14 is arranged on the side opposite the labyrinth mechanism, that is, on the side of the partition plate 15, so as to make the torque transmission area on the side of the partition plate 15 smaller than that on the side of the labyrinth mechanism 16, whereby when the automobile engine is accelerated with a large speed difference from the normal travelling condition in which both sides of the drive disk 7 serve as torque transmission surfaces, the acceleration characteristic of FIG. 6b (C) is obtained.

As described above, the temperature sensitive hydraulic fan coupling according to the present invention has various advantages. That is, due to the structure of the centrifugal valve 14 arranged at the communication hole 7' of the drive disk 7, the communication hole is closed by the valve applied with a centrifugal force resulting from high speed rotation of the drive shaft so that the transmission of torque is performed only through one of the torque transmission gaps formed in the torque transmission chamber 4 while the other such gap prohibiting the flow of oil therethrough and accordingly, by such rotation control mechanism in cooperation of the oil flow adjusting hole opening and closing function by the valve member 8 responsive to the temperature sensitive member 10, the number of revolutions of the fan is reduced thereby reducing the amount of cooling air to be supplied to the engine even when the engine is rotating at high speed especially during high speed travelling of the automobile and at the time of acceleration from the normal travelling condition. Further, since a desired multistage control for the fan is possible, the amount of horsepower consumption can be saved and at the same time, the fan noise level can be reduced in a more effective manner than before.

What is claimed is:

1. A temperature sensitive hydraulic fan coupling comprising: a rotary drive shaft; a solid drive disk having opposed driving sides, a radially outer periphery and at least one communication hole extending between the driving sides, said solid drive disk being fixed to an end of said rotary drive shaft; a sealed box supported on said rotary drive shaft and defining an inner wall surface therein, a partition plate disposed within the sealed box and dividing the sealed box into an oil chamber and a torque transmission chamber, said partition plate having at least one oil flow adjusting hole extending between the oil chamber and the torque transmission chamber, said solid drive disk being received within said torque transmission chamber such that torque transmission gaps are defined between the inner wall surface of the sealed box and the opposed driving sides of the solid drive disk, said oil chamber being provided with an oil circulation passage and said torque transmission chamber being provided with a dam on the inner wall surface in opposite relationship with the radially outer periphery of said solid drive disk and in communication with said oil circulation passage; a temperature sensitive member attached to the sealed box; a valve member having one end fixed to said partition plate and an opposed end lying adjacent to the oil flow adjusting hole of said partition plate, a connecting rod arranged between said valve member and said temperature sensitive member so that when ambient temperature exceeds a set value, the valve member opens said oil flow adjusting hole, while when the ambient temperature is below the set value, the valve member closes said oil flow adjusting hole in response to a deformation of said temperature sensitive member, torque from said rotary drive shaft being transmitted to said sealed box by oil in the torque transmission gaps formed between said solid drive disk and the opposing inner wall surface of sealed box, said torque varying in accordance with contact area of the oil with the driving sides of the solid drive disk, said fan coupling being further characterized in that said solid drive disk is attached with at least one centrifugal valve operative to close said communication hole in said solid drive disk as said drive shaft rotates at high speed for preventing flow of oil from the oil chamber to one of said torque transmission gaps and thereby reducing the contact area of the oil with the solid drive disk and correspondingly reducing the torque transmitted during high speed rotation of the drive shaft.

2. A temperature sensitive hydraulic fan coupling according to claim 1, wherein said centrifugal valve is made of a platy strip arranged such that one end of said valve is pivotal while the other end thereof is suspended by a spring.

3. A temperature sensitive hydraulic fan coupling according to claim 1, wherein said drive disk is provided with a plurality of communication holes and a corresponding plurality of said centrifugal valves provided respectively in the vicinity of each of said communication holes.

4. A temperature sensitive hydraulic fan coupling according to claim 3, wherein the communication holes are disposed substantially circumferentially about the drive disk.

5. A temperature sensitive hydraulic fan coupling according to claim 3, wherein said communication holes are aligned substantially radially on said drive disk.

6. A temperature sensitive hydraulic fan coupling according to claim 2, wherein the spring is a tension spring.

7. A temperature sensitive hydraulic fan coupling according to claim 2, wherein the spring is a compression spring.

8. A temperature sensitive hydraulic fan coupling for multi-stage control of a fan in accordance with ambient temperature and drive shaft speed, comprising:

a rotary drive shaft;

a sealed box rotatably supported on said rotary drive shaft;

a partition plate disposed within said sealed box and dividing said sealed box into an oil chamber and a torque transmission chamber, said partition plate having at least one oil flow adjusting hole extending between the oil chamber and the torque transmission chamber;

temperature sensitive valve means disposed in the oil chamber in proximity to the oil flow adjusting hole for opening the oil flow adjusting hole when ambient temperature exceeds a set value to enable a flow of oil from the oil chamber to the torque transmission chamber and for closing the oil flow adjusting hole when ambient temperature is below the set value to reduce oil flow from the oil chamber to the torque transmission chamber;

oil circulation means disposed in the sealed box for recirculating oil from the torque transmission chamber to the oil chamber in response to rotation of the sealed box;

a solid drive disk rigidly mounted to the drive shaft for rotation therewith and disposed within the torque transmission chamber of the sealed box, said solid drive disk having opposed first and second driving sides spaced from the sealed box to define first and second torque transmission gaps therebetween, a plurality of communication holes extending through the solid drive disk to enable communication of oil with both torque transmission gaps; and a plurality of centrifugal valves mounted to the solid drive disk adjacent to the respective communication holes for sequentially closing the communication holes at higher rotational speeds of the solid drive disk and thereby reducing the amount of oil in the torque transmission gaps and correspondingly reducing the rotational speed of the sealed box.

* * * * *